United States Patent
Chen et al.

(10) Patent No.: US 7,369,494 B2
(45) Date of Patent: May 6, 2008

(54) METHOD AND APPARATUS FOR MANAGING DATA BURSTS

(75) Inventors: Tsao-Tsen Chen, Boonton, NJ (US); Gang Li, Bridgewater, NJ (US); Ming Lu, Hillsborough, NJ (US); Martin H. Meyers, Montclair, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 871 days.

(21) Appl. No.: 10/665,611

(22) Filed: Sep. 19, 2003

(65) Prior Publication Data

US 2005/0063315 A1    Mar. 24, 2005

(51) Int. Cl.
*H04L 1/00*    (2006.01)
(52) U.S. Cl. .................. 370/230.1; 370/229; 370/230; 370/235
(58) Field of Classification Search ................ 370/332, 370/229–239
See application file for complete search history.

(56) References Cited

U.S. PATENT DOCUMENTS 6,088,578 A * 7/2000 Manning et al. ............... 455/68
6,594,241 B1 * 7/2003 Malmlof ..................... 370/329

* cited by examiner

*Primary Examiner*—Duc M. Nguyen
*Assistant Examiner*—Aung T. Win

(57) ABSTRACT

The invention operates to determine a measure of one or more input data parameters, such as input data rate and input data buffer fill at the beginning of a data burst. The invention then proceeds to the selection of an operating data rate for the data burst as a function of the input data parameter measures. In a further step, the invention proceeds to a selection of a duration for the data burst as a function of the selected operating data rate and an end-of-burst data residue parameter.

19 Claims, 3 Drawing Sheets

METHOD AND APPARATUS FOR MANAGING DATA BURSTS

BACKGROUND OF THE INVENTION

1. Field of the Invention

This invention relates to wireless communications systems, and particularly to the management of high-speed data transmission in wireless communications systems.

2. Description of the Related Art

Wireless communication systems have become nearly ubiquitous for the transmission of information signals between a mobile user and another party served by a mobile or fixed network. The focus of early wireless systems, particularly first generation analog systems, was primarily voice communications. With second generation wireless systems, including CDMA, TDMA and GSM, came varying degrees of improvement in terms of voice quality, network capacity and enhanced services. However while second generation systems are suitable to the provision of voice, low-rate data, fax and messaging, they are generally not able to effectively and efficiently address requirements for high-speed mobile data rates.

Third-generation wireless communication systems, using wide-band channel management technologies such as CDMA, will effectively handle a large variety of services, such as voice, video, data and imaging. Among the features supported by third-generation systems is the transmission of high-speed data between a mobile terminal and a land-line network. As is known, high-speed data communication is often characterized by a short transmission "burst" at a high data transmission rate, followed by some longer period of little or no transmission activity from the data source.

To accommodate the bursty nature of such high-speed data services in third generation systems, it is necessary for the communication system to assign a large bandwidth segment (corresponding to the high data rate) from time to time for the duration of the data burst. With the ability of third generation systems to handle such bursty high-speed data transmission, throughput and delay for users is advantageously improved. However, because of the large amount of instantaneous bandwidth required for transmission of a burst of high-speed data, the management of such bursts, and particularly the allocation of power and system resources thereto, should be handled with care to avoid unwarranted interference with other services using the same frequency allocation.

SUMMARY OF THE INVENTION

In order to determine when to request a new data burst, a telecommunications device such as a wireless station (e.g. a base station or mobile station) performs one or more evaluations to identify when the new data burst should be requested. In particular, the method of the invention operates to determine a measure of one or more input data parameters, which in an embodiment are the input data rate and the amount of data available in the input data buffer at the beginning of the data burst. The invention then proceeds to the selection of an operating data rate for the data burst as a function of the input data parameter measures. In an advantageous embodiment, the operating data rate is determined by computing the minimum required data rate as a function of the input data rate and the data content of the input buffer at the beginning of the data burst, with the operating data rate being set at the lowest supported system data rate that is equal to or greater than the minimum required data rate. In a further step, the invention proceeds to a selection of a duration for the data burst from the burst durations supported by the wireless system as a function of the selected operating data rate and an end-of-burst data residue parameter. Advantageously, the system duration is selected that that, when applied with the selected operating data rate, provides a minimum end-of-burst data residue. The burst request methodology of the invention is also provided in respect to an evaluation of the input data buffer fill and the input data rate against defined thresholds for those parameters.

In a further embodiment, the method of the invention is extended to the assignment of system parameters and resources for a data burst request.

DETAILED DESCRIPTION

The invention is directed to a method and system for improved management of high speed data transmission in wireless communications systems, and particularly to the process of establishing a data burst request in such a system and the assignment of system resources addressed to the requested burst. Although the invention will hereafter be described in terms of an advantageous embodiment based on CDMA encoding of the wireless signals, it should be apparent that the methodology of the invention can also be applied for other wireless channelization arrangements, including TDMA and GSM.

Figure 1:
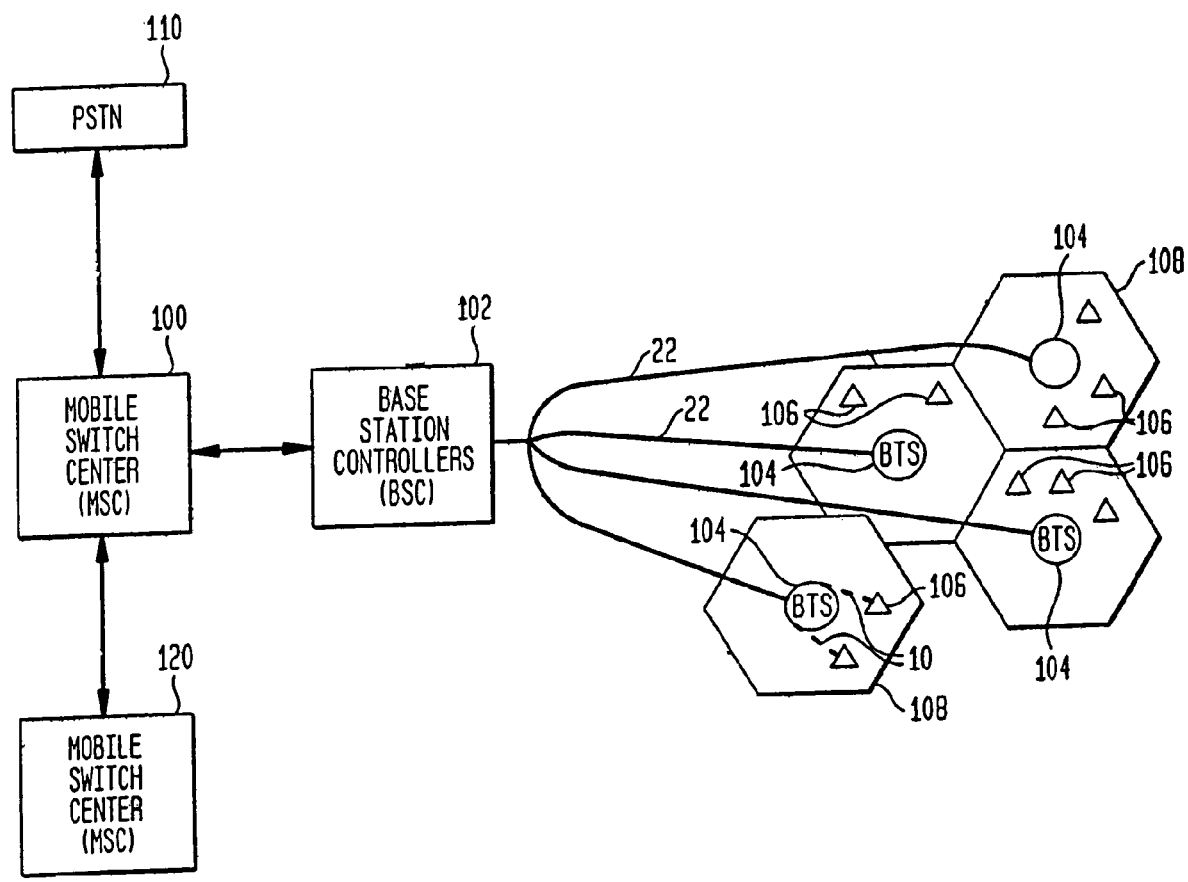
FIG. 1 illustrates a typical structure of a wireless communication system in which the methodology of the invention would be employed.

FIG. 1 illustrates a typical wireless communication system configuration in which the methodology of the invention can be practiced. As illustrated, the system of FIG. 1 comprises a Mobile Switching Center (MSC) 100, a Base Station Controller (BSC) 102 connected therewith, a plurality of Basic Transceiver Stations (BTS) 104 interconnected with and operating under control of the BSC, and multiple Mobile Stations (MS) 106 in wireless communication with one or more BTSs. Buffers (not shown) will be provided in the BTS or BSC and in the MSs for accumulating a plurality of data packets to be transmitted as a data burst. It will of course be recognized that multiple BSCs (and associated BTSs) would, in practice, usually be operated under control of a single MSC, but only a single such BSC is shown for simplicity of illustration.

In addition to providing management and control functions for sub-elements of the wireless network, the MSC 100 also provides an interface between the wireless network and a wireline network, PSTN 110, or a second wireless network, MSC 120. The BSC 102 provides control and management functions for one or more BTSs 104 and transfers information between the BTS 104 and the MSC 100. Each BTS 104 consist of a set of transceivers placed at the wireless site (the transceivers usually being remotely tunable), and is the termination point of the radio path on the network side. Each BTS 104 typically provides coverage for a single cell 108 in the wireless network and is in radio communication with the remote users within that cell, as illustrated in FIG. 1.

Mobile Stations 106, such as cellular telephones, computer terminals, fax machines, or hand-held computers, terminate the radio path from the BTS 104 and provide access to the network services for the served users. The two way radio link between a BTS 104 and its serving MS 106, by convention, is designated as the forward link whenever the BTS 104 transmits to the MS 106 and the reverse link whenever the MS 106 transmits to the BTS 104.

Although FIG. 1 is intended to illustrate a typical wireless system structure within which the methodology of the invention can be practiced, it should be understood that other wireless system architectures are, or may in the future be in use, and that the invention is intended to be applied with such alternate architectures.

Third generation wireless systems are being developed to provide versatile data services via the wireless medium. In order to make the best use of the limited RF spectrum available for such systems, the bursty nature of much of the data traffic needs to be carefully managed and exploited. An important facet of that traffic management objective is that of how the system resources needed for a burst are assigned or allocated to a requesting data user. In other words, what data rate and burst duration will be applied to a scheduled burst, and, as well, based on what target frame-error-rate (FER). The problem is further complicated with taking into account data flow control (e.g., TCP flow control). A data burst assignment methodology provided according to the invention is described below for addressing this objective.

The methodology of the invention is fundamentally addressed to the control of data bursts in high-speed wireless systems. Burst control can be understood as consisting of two separate processes: burst request and burst assignment. A burst request should be established as a function of data traffic status while burst assignment will be dependent upon the radio resources (e.g., power, Walsh functions) available and system loading condition.

In practice a burst request may be characterized as: (1) an outstanding burst request, (2) a scheduled burst, or (3) an ongoing burst. A burst will be in the outstanding state after a burst request is made and before a response (e.g., burst assignment message) is received. A burst will be in the scheduled state after the corresponding assignment message is received and before the burst comes into effect. A burst in the active state, or in progress, is called an ongoing burst. Note that there may be three bursts in the ongoing, scheduled and outstanding states, respectively, at a time. An ongoing burst can be terminated by the next following burst before it is finished; A scheduled burst can be replaced by the next following scheduled burst before it starts; and an outstanding burst can be cancelled or replaced by a newly arriving burst request.

Usually, a data burst is defined by its data rate, duration and target quality (e.g., frame-error-rate), as well as its start time. A burst should come into effect as soon as possible once it is assigned.

Figure 2:
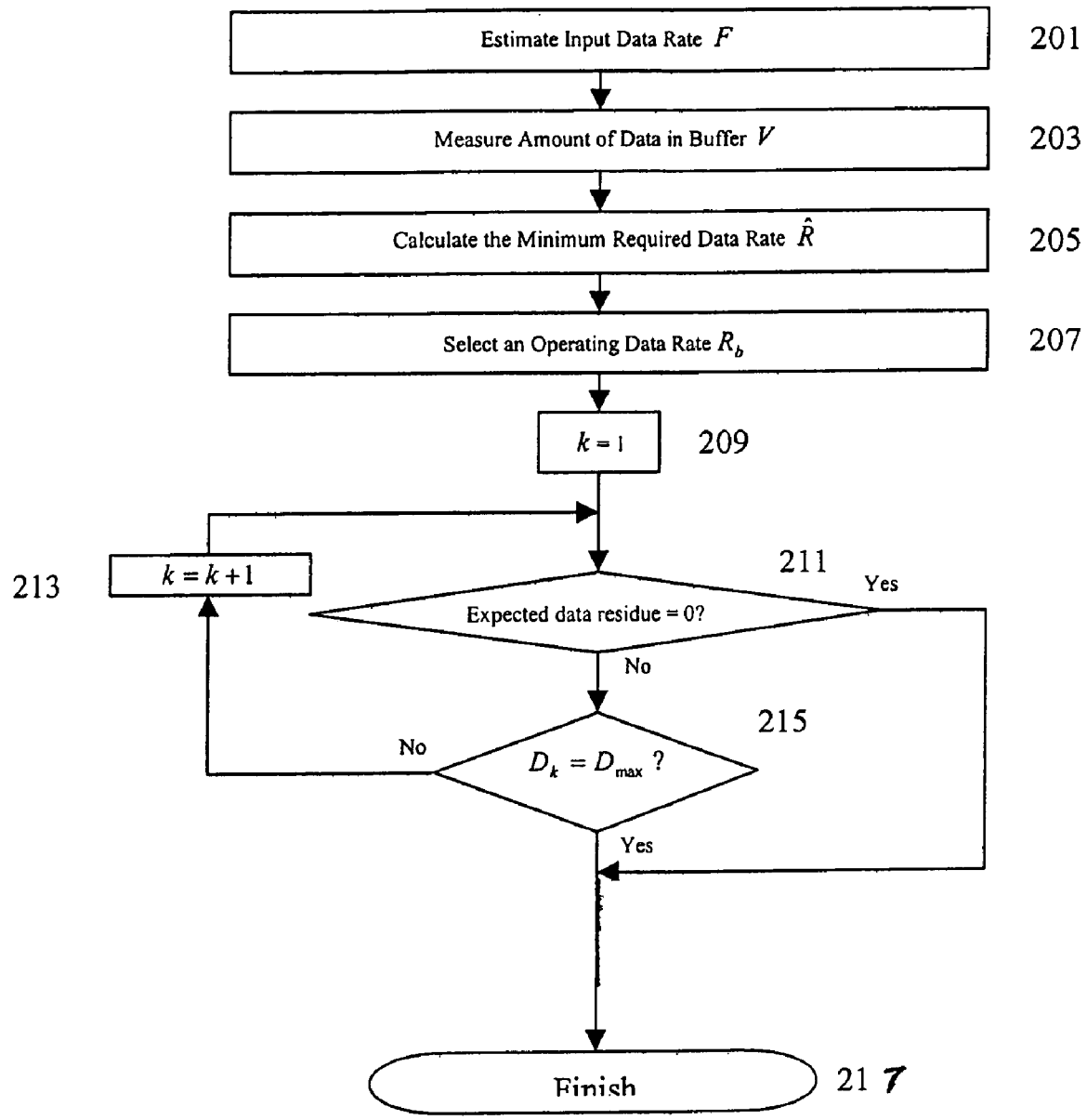
FIG. 2 is a flowchart of an embodiment of the invention for determining data burst parameters.

In FIG. 2, a flow chart is provided for the determination of the burst data rate and duration according to the method of the invention, in respect to a given burst request. Prior to describing that figure, it is noted that a wireless system usually supports a number of fixed data rates, as well as a plurality of burst durations between a minimum and maximum length burst duration. For convenience of reference, the multiple supported data rates will be designated $R_i$, for $i=1, 2, \ldots, N$, and the maximum supported data rate designated as $R_{max}$. Similarly, the burst durations supported by the system will be designated $D_k$ for $k=1, 2, \ldots, K$ and the minimum and maximum burst duration will be designated as $D_{min}$ and $D_{max}$, respectively. Also of note is that an overhead factor, representing overhead introduced during the process of data formatting (e.g., in multiplex and RLP sub-layers), needs to be taken into account in the course of determining burst data rate. Hereafter, the normalized overhead factor will be denoted by $\alpha$ ($\alpha<1$).

With reference now to FIG. 2, at step 201 an estimate is made of the input data rate, F. In an advantageous embodiment of the invention, that estimate is made over an observation interval, designated hereafter as W (in time units), which may be a sliding window. If the amount of data received within the observation window is E (in bits or bytes), then the input data rate will be given by $F=E/W$. Next, at step 203, a determination is made of the amount of data then in the input data buffer, that amount being designated herein as V (bits or bytes).

In step 205, a determination is made of the minimum required data rate for transmission of the data in the burst request, designated herein as $\hat{R}$. That minimum required data rate can be calculated as the sum of the estimated input data rate and the rate needed to transmit the data currently in the buffer over an interval corresponding to the maximum burst duration, with that sum scaled by a factor related to the overhead term. Algebraically, the minimum required data rate will be given by:

$$\hat{R} = \frac{1}{1-\alpha}\left(F + \frac{V}{D_{max}}\right)$$

Then, in step 207, the minimum required data rate determined in the previous step is used to select an operating data rate, designated herein as $R_b$. Specifically, one selects the lowest operating channel rate among the rates supported by the system that is equal to or greater than the minimum required data rate—i.e., $R_b=\min\{R_i\}$. However, if the minimum required data rate, $\hat{R}$, is greater than the maximum supported channel rate, $R_{max}$, the operating data rate is set to $R_{max}$.

Upon determining the operating data rate for the burst request under consideration, the method of the invention moves to a determination of the burst duration for the requested burst. In principle, this determination is made by selecting the shortest duration among the burst durations supported by the system ($D_k$) for which the product of the selected operating data rate ($R_b$) and the selected burst duration ($D_k$), when scaled by an overhead factor function, is equal to or greater than the sum of the amount of data then in the input data buffer (V) and a product of the input data rate (F) and the selected burst duration ($D_k$). Algebraically this duration selection relationship, where the duration selected for the requested burst is designated $D_b$, can be denoted as:

$$D_b=\min\{D_k|(1-\alpha)R_b D_k \geq F \cdot D_k + V\}$$

Note, however, that in the case where the preceding algebraic relationship cannot be satisfied, the maximum supported burst duration ($D_{max}$) is selected for the duration of the requested burst—i.e., $D_b=D_{max}$.

In an advantageous embodiment of the invention, the determination of the burst duration for the requested burst is made by an iterative consideration of increasing burst durations (among the supported durations) until the difference between the $(1-\alpha)R_b D_k$ term and the $F \cdot D_k + V$ term in the above algebraic relationship is approximately equal to 0, at which point the burst duration then under consideration is accepted as the duration for the requested burst. This iterative process is shown at steps 209 through 215 of the flow chart of FIG. 2. Thus, at step 209 an index variable, k, for the supported burst durations is initially set to "1," corresponding to the shortest of the supported burst durations. At step 211, the difference described above is evaluated—i.e., $(1-\alpha)R_b D_k$ less $F \cdot D_k + V$—to determine an Expected Data Residue. If that Expected Data Residue is materially greater than 0, the process moves to step 215 where a determination is made of whether the burst duration value then under consideration is equal to the maximum supported duration (i.e. $D_k = D_{max}$). If not, the duration index variable is increased by 1, at step 213, and steps 209, 211 and 215 are repeated with the higher burst duration value. At the duration value for which the Expected Data Residue is found to be approximately 0, in step 211, or the duration value under consideration is found to equal the maximum supported duration, at step 215, the process concludes with the selection of that duration value. As will be apparent to those skilled in the art, with given amount of data in the buffer, one can calculate the amount of residual data for each possible set of burst parameters. If the residue value becomes negative, this means that the burst can accommodate all of the data offered for the burst, so that the residue is actually zero.

In a further embodiment of the invention, a method is provided for determining the assignment of system parameters needed for a requested data burst, and, as well, an alternate methodology for burst-request initiation is provided. The methodology of this further embodiment is illustrated in the flow chart of FIG. 3. Prior to describing the steps of this further embodiment, however, certain nomenclature used in that description should be noted. The terms $R_b$ and $D_b$ refer respectively to the selected data rate and burst duration for the data burst under consideration, as determined according to the embodiment heretofore described, or by another known methodology. The term $FER_b$ denotes the target frame error rate for the requested burst, and will be determined by any known methodology. The term $t_b$ denotes the start time of a data burst under consideration. New data burst parameter terms Trigger Threshold (denoted trigger_thresh), Rate Threshold (denoted rate_thresh), Buildup Threshold (denoted buildup_thresh) and Burst Setup Time (denoted burst_setup_time) are introduced here to describe certain aspects of the methodology of this further embodiment. Although these new burst parameter terms will generally be understood from the context in which they are used, a brief function description of those terms is provided below.

1) Trigger threshold (trigger_thresh): An amount of data in the input buffer that exceeds trigger_thresh will trigger a data burst request.
2) Rate threshold (rate_thresh): An input data rate that exceeds rate_thresh will trigger a burst request even if the amount of data in input buffer is less than trigger_thresh.
3) Buildup threshold (buildup_thresh): If the current data burst is expected to be unable to clean up the data in the buffer, a new burst with higher data rate may need to be invoked before the burst ends.
4) Burst setup time (burst_setup_time): If data transmission is to be continued, the next burst should be requested early by a burst_setup_time.

Figure 3:
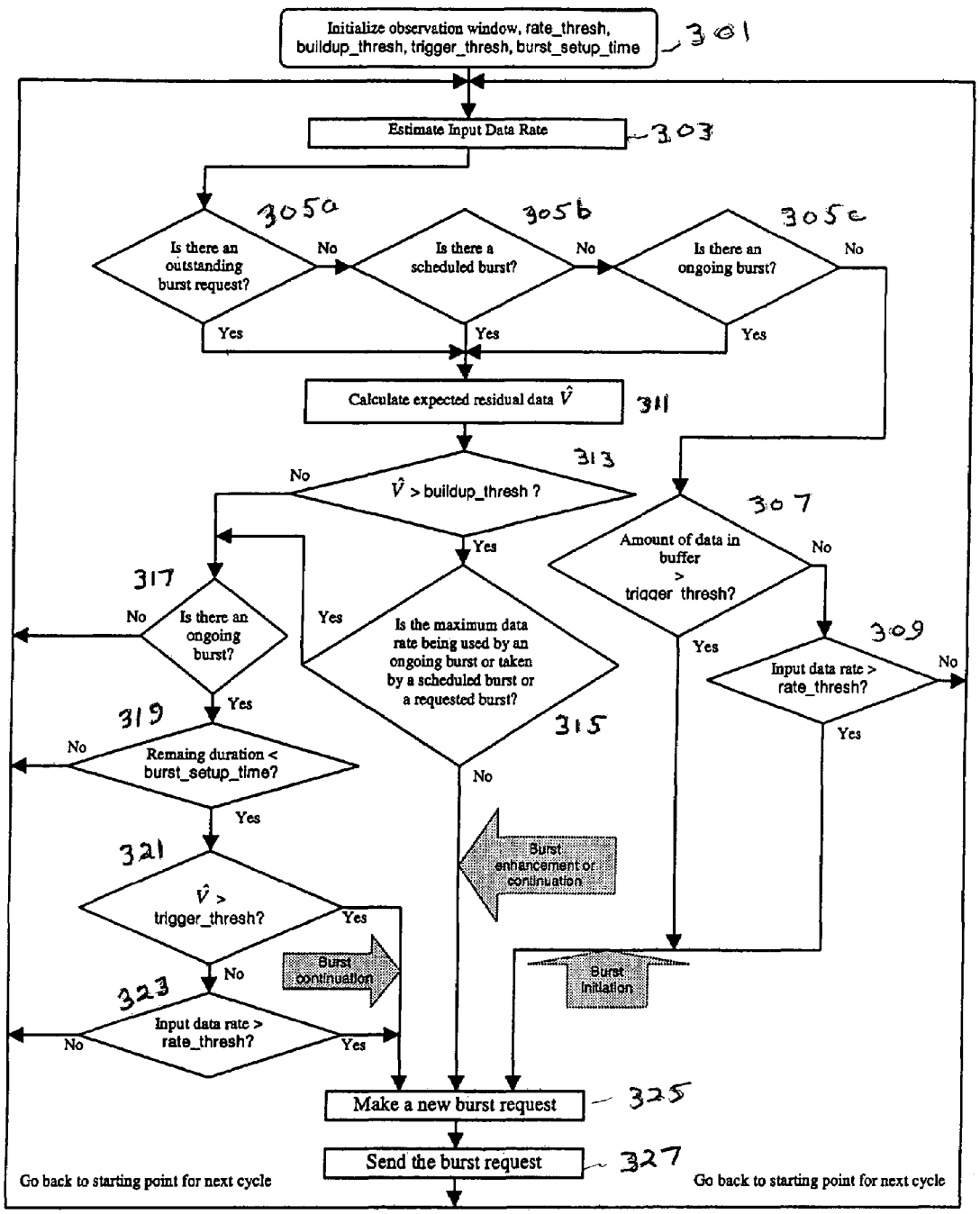
FIG. 3 is a flowchart for a further embodiment of the invention directed to timing of a requested data burst.

With reference now to the flow chart of FIG. 3, the process of this further embodiment begins, at step 301, with an initiation of an observation window, W, rate threshold, trigger threshold, build-up threshold and burst setup time parameters. Note that the observation window may be the same as that used with the previously described embodiment for determining data rate and duration for a requested burst. At step 303, an estimate of the input data rate is made. Like the prior embodiment, this estimate is advantageously made over the observation interval W, such that the input data rate will be given by F=E/W (E being the amount of data received within the observation window (in bits or bytes)). When the method of the further embodiment is used with the burst rate and duration-determination methodology of the previously described embodiment, then this step need not be repeated, with the value determined in the previously described embodiment being also used here.

At the time that the process of this further embodiment starts, there may already be one or more data bursts underway. An evaluation is made at steps 305*a-c* as to whether any ongoing, outstanding or scheduled data burst is already in existence. In the case of a determination being made that no ongoing, outstanding or scheduled data burst exists, an evaluation is undertaken respecting the need for burst-request initiation. To that end, at step 307, a determination is made of whether the amount of data in the input buffer, V (as determined in step 203 of the previously described embodiment, or an alternative known methodology) exceeds the value of the trigger_thresh parameter. If so, the process moves to step 325, where a new burst request is initiated, followed by a sending of the burst request, at step 327, and a return to the starting point for consideration of resource assignment for the new burst request. In the case of the data in the input buffer, V, being less than the trigger_thresh parameter, the process moves to step 309 where a further determination is made as to whether the input data rate, F, is greater than the rate_thresh parameter. If so the process also moves to step 325, where a new burst request is initiated. If the input data rate is not greater than the rate_thresh parameter value (and the data in the input buffer is less than trigger_thresh), the process returns to the starting point, at step 303, to begin a new cycle.

Returning to steps 305*a-c*, and the case where at least one of an ongoing, outstanding or scheduled data burst is found to exist, the process of this further embodiment moves to step 311, where a determination is made of an expected amount of end-of-burst residual data in the input data buffer, that value denoted herein as $\hat{V}$.

If the burst found to exist in steps 305*a-c* is an outstanding or scheduled data burst, the end-of-burst residual data value is computed using the following formula:

$$\hat{V} = \max\{V - (1-\alpha)(1-FER_b)R_b D_b, 0\}$$

where $\alpha$ refers to the overhead factor identified in the previously-described embodiment, and the remaining terms are as set forth above.

If, however, the burst found to exist in steps 305*a-c* is an ongoing data burst the burst duration term in the formula for determining end-of-burst residual data value is adjusted to reflect only the remaining value of the burst duration. Thus, for the case of an ongoing data burst, the residual data value is computed as:

$$\hat{V} = \max\{V - (1-\alpha)(1-FER_b)R_b(D_b - \text{current\_time} + t_b), 0\}$$

Once the expected residual data value, $\hat{V}$, has been determined, that value is compared to the buildup_thresh parameter in step 313. If $\hat{V}$ is greater than the buildup_thresh parameter value, the process moves to step 315, where a determination is made as to whether the maximum data rate supported by the system is being used by an ongoing data burst or assigned to a scheduled or requested data burst. If not, the process moves to step 325, where a new data burst request is initiated. In other words, if the current data burst will be unable to transmit the data in the input data buffer by the end of the current burst, the method of the invention operates to initiate a new data burst to address the residue in the input buffer.

If either the expected residual data value, $\hat{V}$, is found to the less than the buildup_thresh parameter value in step 313, or the maximum supported data rate is found to be used or assigned in step 315, the process moves to step 317 where a determination is made as to whether the burst under consideration is an ongoing data burst. If not, the process returns to the starting point, at step 303, to begin a new cycle. If such an ongoing data burst is found in step 317, the process moves to step 319, where a determination is made as to whether the remaining duration of the ongoing burst (advantageously computed as $(D_b-\text{current\_time}+t_b)$) is less than the burst_setup_time parameter value. If not, the process returns to the starting point, at step 303, to begin a new cycle. However, if the remaining duration of the ongoing burst is greater than or equal to the burst_setup_time parameter value, the process continues on to step 321.

At step 321, a determination is made as to whether the expected residual data value, $\hat{V}$, for the ongoing burst is greater than the trigger_thresh parameter value, thus suggesting a need for burst continuation in order to address the remaining data in the input buffer. If so, the process moves to step 325, where a new data burst is initiated. If $\hat{V}$ is equal to or less than the trigger_thresh parameter value, the process moves to step 323, where the input data rate is compared with the rate_thresh parameter value. For the case of the input data rate being greater than the rate_thresh parameter value, the process moves to step 325, where a new data burst is initiated. Alternatively, if the input data rate is equal to or less than the rate_thresh parameter value, the process returns to the starting point, at step 303, to begin a new cycle.

While this invention has been particularly shown and described with references to advantageous embodiments thereof, it will be understood by those skilled in the art that various changes in form and details may be made therein without departing from the spirit and scope of the invention, as defined by the appended claims.

Also, other arrangements of embodiments of the invention that are disclosed herein include a computer program product that has a computer-readable medium including computer program logic encoded thereon. When executed on at least one processor, the computer program product causes the processor to perform the operations (e.g., the methods) indicated herein as embodiments of the invention. The methods of the invention may be implemented by computer software and/or hardware mechanisms within a telecommunications apparatus. It is to be understood that the system of the invention can be embodied strictly as a software program, as software and hardware, or as hardware alone.

What is claimed is:

1. A method for managing a data burst comprising the steps of:
   determining one or more input parameters;
   selecting a data rate for the data burst as a function of the one or more input parameters; and
   selecting a duration for the data burst as a function of the selected data rate;
   wherein the step of selecting a data rate includes the further step of:
   determining a minimum required data rate as a sum of an input data rate and a rate needed to transmit data stored in an input buffer at the beginning of the data burst over a maximum available burst duration.

2. The method of claim 1 wherein the step of selecting a duration is further made as a function of an end-of-burst data residue parameter.

3. The method of claim 1 wherein the step of selecting a duration further comprises:
   evaluating a plurality of burst durations and selecting the duration that, when applied with the selected data rate, provides a minimum end-of-burst data residue.

4. The method of claim 1 wherein the one or more input data parameters include an input data rate and an amount of data available in an input data buffer at the beginning of the data burst.

5. The method of claim 4 wherein the measure of the input data rate is determined as a function of an amount of data offered for transmission over a defined observation interval.

6. The method of claim 1 wherein the selected data rate is determined as the lowest supported operating channel rate that is equal to or greater than the determined minimum required data rate.

7. A method for managing a data burst comprising the steps:
   determining one or more input parameters; selecting a burst data rate equal to or greater than a minimum data rate determined as a sum of an input data rate and a rate needed to transmit data stored in an input buffer at the beginning of the data burst over a maximum available burst duration;
   evaluating at least one of the input parameters against a threshold for the parameter;
   if the input parameter exceeds the threshold, forming a new data burst for transmission of the input data.

8. The method of claim 7 wherein the one or more input data parameters include an input data rate and an amount of data available in an input data buffer at the beginning of the data burst.

9. The method of claim 8 wherein the evaluating step is applied for the input data rate and the threshold is established as an input data rate needed to trigger a new data burst for transmission of the input data.

10. The method of claim 7 wherein, upon making a determination in the evaluating step that the amount of data available in the input data buffer does not exceed the defined threshold, the evaluating step is then applied for the input data rate and the threshold is established as an input data rate needed to trigger a new data burst for transmission of the input data.

11. A method for managing a data burst comprising the steps of:
    determining one or more input parameters; selecting a burst data rate equal to or greater than a minimum data rate determined as a sum of an input data rate and a rate needed to transmit data stored in an input buffer at the beginning of the data burst over a maximum available burst duration;
    determining residual data remaining in an input buffer in a data burst arranged to transmit offered input;
    evaluating the determined residual data against a threshold.

12. The method of claim 11 wherein the evaluating step threshold is established in relation to a need for an additional data burst for transmission of the input.

13. The method of claim 11 including the further steps of:
in the case of the determined measure of residual data not exceeding the threshold, determining if the data burst under consideration is an ongoing data burst;
if the data burst is an ongoing burst, evaluating whether the remaining duration of the ongoing burst is less than a defined burst set-up threshold,
if the remaining duration is less than the set-up time threshold, evaluating whether the measure of residual data is greater than a threshold is established as an amount of data in the input data buffer to trigger a new data burst,
in the case of the residual data measure exceeding the threshold, forming a new data burst for transmission or the input data.

14. The method of claim 13 wherein, for the case of the residual data measure not exceeding the threshold, evaluating a measure of an input data rate against a threshold established in respect to an input data rate sufficiently high to trigger a new data burst, and
in the case of the input data rate exceeding the threshold, forming a new data burst for transmission or the input data.

15. The method of claim 11 including the further steps of:
in the case of the data rate not being less the maximum supported data rate, determining if the data burst under consideration is an ongoing data burst;
if the data burst is an ongoing burst, evaluating whether the remaining duration of the ongoing burst is less than a defined burst set-up threshold,
if the remaining duration is less than the set-up time threshold, evaluating whether the measure of residual data is greater than a threshold is established as an amount of data in the input data buffer to trigger a new data burst,
in the case of the residual data measure exceeding the threshold, forming a new data burst for transmission or the input data.

16. The method of claim 15 wherein, for the case of the residual data measure not exceeding the threshold, evaluating a measure of an input data rate against a threshold established in respect to an input data rate sufficiently high to trigger a new data burst, and
in the case of the input data rate exceeding the threshold, forming a new data burst for transmission or the input data.

17. The method of claim 7 wherein the evaluating step is applied for an amount of data available in an input data buffer at the beginning of the data burst, and the threshold is established as an amount of data in the input data buffer that will trigger a new data burst request for transmission of the input data.

18. The method of claim 11 including the further steps of:
in the case of the determined measure of residual data exceeding the threshold, determining whether a data rate for a data burst under consideration is less than a maximum supported data rate; and
if the data rate is less the maximum supported data rate, causing a new data burst to be initiated.

19. A computer readable medium having instructions stored thereon and capable of being executed by a computer for carrying out the method of claim 1.

* * * * *